United States Patent
Nakagawa et al.

(10) Patent No.: US 8,713,307 B2
(45) Date of Patent: Apr. 29, 2014

(54) COMPUTER SYSTEM AND VOLUME MIGRATION CONTROL METHOD USING THE SAME

(75) Inventors: Hirotaka Nakagawa, Sagamihara (JP); Mioko Mori, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/386,156

(22) PCT Filed: Dec. 16, 2011

(86) PCT No.: PCT/JP2011/007055
§ 371 (c)(1), (2), (4) Date: Jan. 20, 2012

(87) PCT Pub. No.: WO2013/088485
PCT Pub. Date: Jun. 20, 2013

(65) Prior Publication Data
US 2013/0159700 A1    Jun. 20, 2013

(51) Int. Cl.
*G06F 13/00* (2006.01)
*G06F 15/16* (2006.01)
*G06F 15/173* (2006.01)
*H04L 29/06* (2006.01)

(52) U.S. Cl.
USPC ........... 713/155; 709/202; 709/213; 709/214; 709/215; 709/226; 710/33; 713/153; 713/166; 713/193

(58) Field of Classification Search
USPC ........... 709/202, 213–215, 226, 244; 710/33; 713/153, 155, 166, 193; 726/33, 202, 726/213–215, 226
See application file for complete search history.

(56) References Cited

U.S. PATENT DOCUMENTS

| | | | |
|---|---|---|---|
| 2008/0046671 A1* | 2/2008 | Sato et al. | 711/162 |
| 2008/0240434 A1* | 10/2008 | Kitamura | 380/255 |
| 2009/0164780 A1* | 6/2009 | Murayama et al. | 713/165 |
| 2009/0187721 A1* | 7/2009 | Ueoka et al. | 711/162 |
| 2010/0031062 A1 | 2/2010 | Nishihara et al. | |
| 2010/0115223 A1* | 5/2010 | Sakaguchi | 711/170 |
| 2010/0332454 A1* | 12/2010 | Prahlad et al. | 707/654 |
| 2011/0137865 A1* | 6/2011 | Shin et al. | 707/648 |

FOREIGN PATENT DOCUMENTS

JP    2010-33319 A    7/2008

* cited by examiner

*Primary Examiner* — Beemnet Dada
*Assistant Examiner* — Kalish Bell
(74) *Attorney, Agent, or Firm* — Volpe and Koenig, P.C.

(57) ABSTRACT

A computer system regarding which there is no possibility that data loss or data leakage will occur caused by volume migration is provided.

The computer system includes: a memory resource to be accessed by a host computer; a storage system for providing a volume, which logicizes the memory resource, to the host computer; and a management device for managing migration of the volume. When detecting a task of migration of the volume based on a request from a first administrator, the management device compares an encryption function setting status of the volume with the encryption function setting status of a migration destination object of the volume; and sends notice of this comparison result to a second administrator, who is different from the first administrator, for security management of the storage system.

9 Claims, 22 Drawing Sheets

FIG. 5

STORAGE MANAGEMENT TABLE 620

| STORAGE ID | SERIAL# | MANAGEMENT PORT IP ADDRESS |
|---|---|---|
| ST1 | 121212 | 192.168.1.1 |
| ST2 | 988898 | 192.168.19.2 |
| ST3 | 487651 | 192.168.21.2 |

VOLUME MANAGEMENT TABLE 622

| VOLUME ID | PG ID |
|---|---|
| ST1.VOL1 | ST1.PG1 |
| ST2.VOL3 | ST2.PG2 |
| ST3.VOL41 | ST3.PG3 |

PARITY GROUP MANAGEMENT TABLE 624

| PG ID | ENCRYPTION STATUS | ENCRYPTION KEY ID |
|---|---|---|
| ST1.PG1 | ON | KEY001234 |
| ST1.PG2 | OFF | 0 |
| ST2.PG3 | ON | KEY000023<br>KEY000042<br>KEY000053<br>KEY000063<br>KEY000052 |
| ST3.PG4 | N/A | 0 |

KEY MANAGEMENT TABLE 626

| KEY ID | CREATION DATE | KEY BACKUP TYPE | KMS IP ADDRESS |
|---|---|---|---|
| KEY001234 | 20110511.0000.12 | KMS | 192.168.24.2 |
| KEY000023 | 20101123.0512.35 | FILE | |
| KEY000042 | 20101123.0512.35 | FILE | |
| KEY000053 | 20101123.0512.35 | FILE | |
| KEY000063 | 20101123.0512.35 | FILE | |
| KEY000052 | 20101123.0512.35 | FILE | |

POOL MANAGEMENT TABLE 1100

| POOL ID | ENCRYPTION STATUS | POOL VOLUME ID | PARITY GROUP |
|---|---|---|---|
| ST1.POOL01 | ON | ST1.VOL0001 | ST1.PG01 |
| | | ST1.VOL0002 | ST1.PG02 |

FIG. 13

| BIT ADDRESS(BIT) | AUTHORITY |
|---|---|
| 0 | View user account information |
| 1 | Setting user account information |
| 2 | View audit log |
| 3 | Setting new audit log |
| 4 | Key Management |
| 5 | Data Encription Management |
| 6 | View Elements information |
| 7 | Setting LDEV from PG/External Volume/Pool |
| 8 | Setting Source LDEV from PG |
| 9 | Setting Host path |
| 10 | Setting External Volume |
| 11 | Setting DP/Snapshot pool |
| 12 | Setting LUSE |
| 13 | Setting Local Copy |
| 14 | Setting Remote Copy |
| 15 | Setting MPPK/Cache mode |
| 16 | Setting PG |
| 17 | Setting Port Attribute |

| ROLE ID (1400A) | ROLE NAME (1400B) | AUTHORITY BITMAP (1400C) |
|---|---|---|
| ROLE1 | SECURITY (VIEW) | 0000000000 1000001 |
| ROLE2 | SECURITY (VIEW/MODIFY) | 0000000000 110011 |
| ROLE3 | AUDIT LOG (VIEW) | 0000000000 000100 |
| ROLE4 | AUDIT LOG (VIEW/MODIFY) | 0000000000 001000 |
| ROLE6 | STORAGE MANAGEMENT (VIEW) | 0000000000 1010000 |
| ROLE7 | PROVISIONING | 0000000000 11010000 |
| ROLE8 | POOL MANAGEMENT | 0000001001 01010000 |
| ROLE9 | UVM MANAGEMENT | 0000000101 01010000 |
| ROLE10 | LOCAL COPY | 0000100101 01010000 |
| ROLE11 | REMOTE COPY | 0001000001 01010000 |
| ROLE12 | PERFORMANCE MANAGEMENTI | 0000000000 01010000 |
| ROLE13 | SYSTEM RESOURCE MANAGEMENT | 1010000000 01010000 |
| ROLE14 | VENDOR MAINTENANCE | 11 111111 1111 11111 11 |
| ROLE15 | USER MAINTENANCE | 1110000000 01010000 |

FIG.15

| USER GROUP ID | ROLE |
|---|---|
| UG01 | ROLE7 |
| UG02 | ROLE8 |
| UG03 | ROLE9 |
| UG04 | ROLE2 |

| USER ID | USER GROUP ID |
|---|---|
| ST_ADMIN1 | UG01 |
| SECURITY_ADMIN | UG04 |

1600A / 1600B

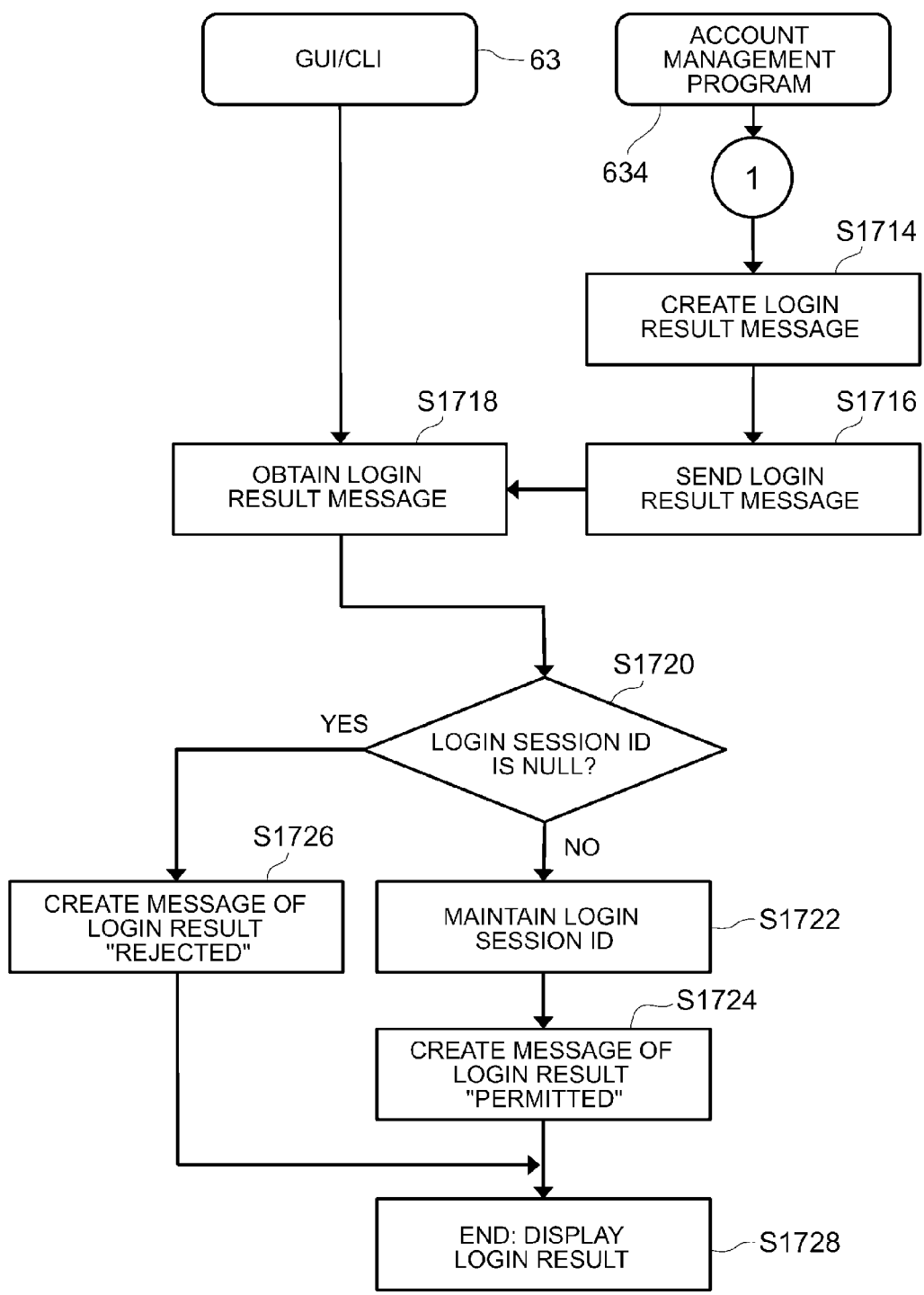

COMPUTER SYSTEM AND VOLUME MIGRATION CONTROL METHOD USING THE SAME

TECHNICAL FIELD

The present invention relates to a computer system capable of executing volume mobility securely and a volume migration control method using such a computer system.

BACKGROUND ART

Recently, the scale of a storage system for a computer system has been expanding due to an increase of an amount of information to be processed by an information processing system. A storage system in which a plurality of storage devices are arrayed is known as an example of the above-mentioned storage system. With the storage system, data is stored in an array system by a storage controller processing data from a host computer.

Information processing systems are exposed to various security threats and storage systems are no exception. Therefore, it is necessary to always prepare for the various threats such as data theft, unauthorized access, falsification, and data destruction. Regarding security systems associated with the storage system, there are upper-level-application-side security at a host computer and storage side security. A security function on the storage system side is enhanced in order to reduce the burden on the high-level applications.

Even if the security function on the storage system side is enhanced, a storage-drive-based encryption function would possibly face data leakage due to a theft or taking out of the storage drives from a chassis of the storage system. So, a storage-controller-based encryption function is provided instead of or together with the storage-drive-based encryption function. When data is stored in the storage drive by using the above-mentioned encryption function, the storage controller can directly encrypt data and store the encrypted data in the storage drive. Then, since an encryption key is managed by the storage controller, even if the storage drive is taken out for the purpose of, for example, device maintenance, the encryption key will not exist in the storage drive itself and it is difficult to carry out unauthorized analysis of data, thereby realizing a data leakage countermeasure of a high security level.

A secret key that is required for data encryption and decoding is commonly stored as a file by a security administrator or managed by a server that performs key management services (KMS). The KMS manages secret key generation, issue, backup, and recovery in an integrated manner.

Incidentally, a conventional example of a storage system equipped with the storage-controller-based encryption function is described in, for example, Japanese Patent Application Laid-Open (Kokai) Publication No. 2010-33319.

CITATION LIST

Patent Literature

PTL 1: Japanese Patent Application Laid-Open (Kokai) Publication No. 2010-33319

SUMMARY OF INVENTION

Technical Problem

In a cloud environment, a volume mobility function migrating volumes out of the storage system is required. For example, the volume mobility function that would not stop a host computer(s) along with VM (virtual machine) migration between host computers or resource load distribution between storage systems is desirable. Specified storage functions such as data migration between a plurality of volumes, data replication, and volume addition to a pool are realized by volume migration.

However, if an administrator of the storage system migrates a volume, to which a data encryption function is set, to an object to which the encryption function is not set, there is a possibility that data may be leaked. Furthermore, even if the encryption function is set to a migration destination volume, if a protection level of an encryption key for a migration destination volume is lower than that of a migration source volume, this would result in data loss due to loss of the encryption key or data leakage due to leakage of the encryption key at the migration destination volume.

Furthermore, when migrating a volume during a volume life cycle, events such as cancellation of encryption at the migration destination or a level change of the encryption function occur in order to, for example, switch to a host-based encryption system. When this happens, if a storage administrator can easily cancel the encryption at the migration destination, this might result in data leakage or violation of a security policy. So, the security administrator needs to cancel or change the encryption function at the migration destination; however, just simply cancelling or changing the encryption function at the migration destination would impair flexibility of a volume mobility function.

Therefore, it is an object of the present invention to provide a computer system regarding which there is no possibility that data loss or data leakage will occur as a result of volume migration. It is another object of this invention to provide a computer system that enables the security administrator to securely and flexibly change the encryption function at a volume migration destination without impairing the flexibility of the volume mobility function.

Solution to Problem

In order to achieve the above-described objects, a computer system according to the present invention includes a memory resource to be accessed by a host computer, a storage system for providing a volume(s), which logicizes the memory resource, to the host computer, and a management device for managing migration of the volume; wherein when the management device detects a task of migration of the volume based on a request from a first administrator, it compares an encryption function setting status of the volume with the encryption function setting status of a migration destination object, and sends notice of this comparison result to a second administrator, who is different from the first administrator, for security management of the storage system.

Advantageous Effects of Invention

According to the present invention, the encryption function setting status of a volume can be adjusted to match the encryption function setting status of a migration destination object of that volume in relation to migration of the volume. So, a computer system regarding which there is no possibility that data loss or data leakage will occur as a result of the volume migration can be provided. Furthermore, according to the present invention, a computer system that enables the security administrator to securely and flexibly change the encryption function at a volume migration destination without impairing the flexibility of the volume mobility function can be provided.

BRIEF DESCRIPTION OF DRAWINGS

FIG. 5 is an example of a storage management table for managing the storage system.

FIG. 6 is an example of a management table for managing volumes.

FIG. 7 is an example of a parity group management table for managing parity groups.

FIG. 8 is an example of an encryption key management table.

FIG. 11 is an example of a specific pool management table that is required for encryption setting processing executed by the computer system according to the second embodiment.

FIG. 13 is an example of an authority management table to which the correspondence relationship between authorities granted to a user and bit addresses is set.

FIG. 14 is an example of a table for managing the correspondence relationship between user roles and authority bitmaps.

FIG. 15 is an example of a management table relating to the correspondence relationship between user group (UG) IDs and roles.

FIG. 16 is an example of a management table relating to the correspondence relationship between user IDs and user group IDs.

FIG. 17B is a flowchart (second half) illustrating the processing executed by the management server on login from the user.

DESCRIPTION OF EMBODIMENTS

Figure 1:
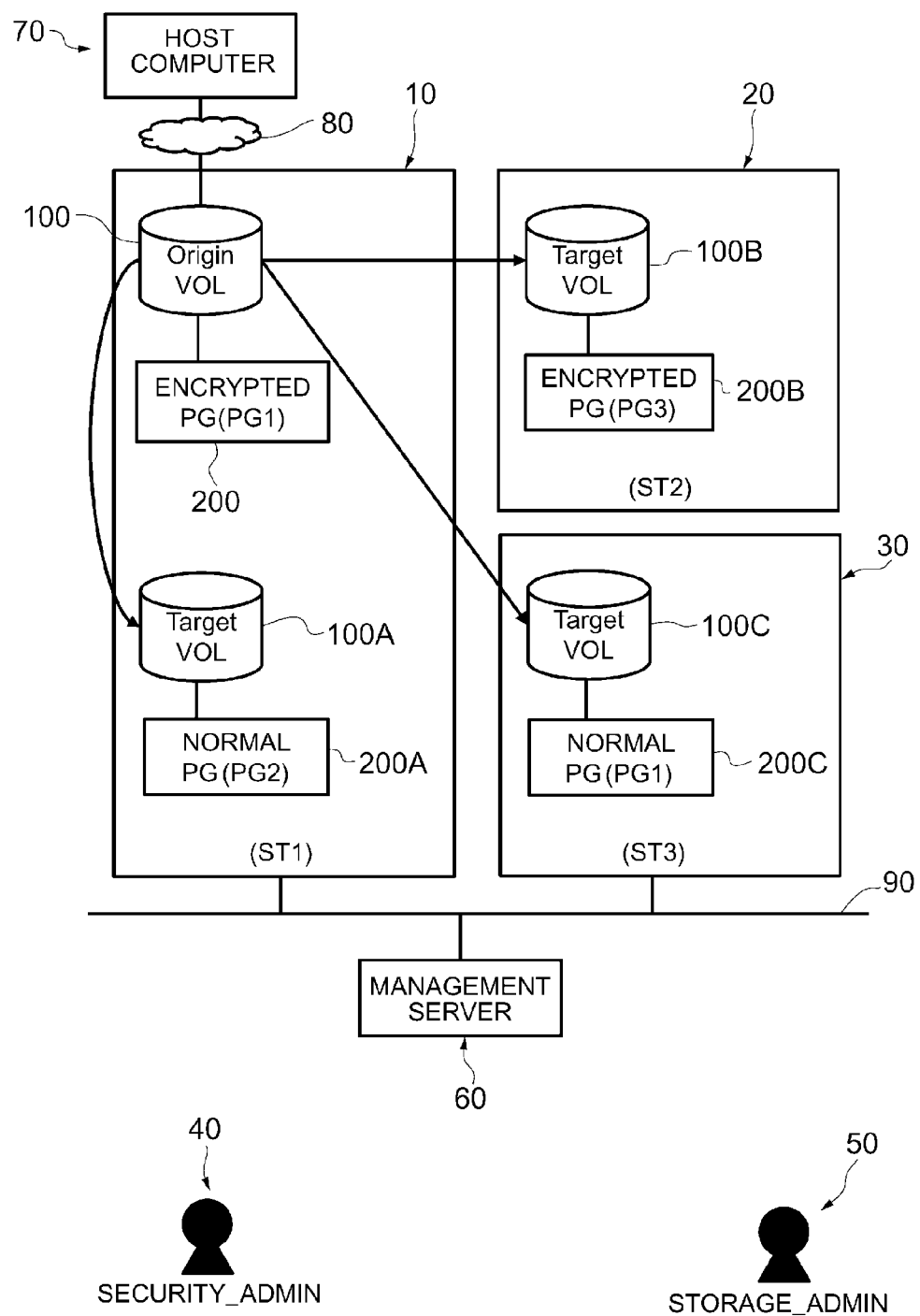
FIG. 1 is a block configuration diagram of a computer system according to a first embodiment.

Next, an embodiment of the present invention will be explained. FIG. 1 is a block diagram of a computer system according to a first embodiment. While a computer system of the present invention may be equipped with one or more storage systems, the computer system according to this embodiment is equipped with a host system, a plurality of storage systems, and a management device for managing volume migration and an encryption function relating to the volume migration. Forms of the volume migration include data migration between a plurality of volumes, data replication between the plurality of volumes, and addition of a volume to a pool according to thin provisioning. Storage drives mounted in the storage system may be semiconductor memory drives such as SSDs, besides disk drives such as hard disk drives.

The computer system includes a host computer 70, a first storage system (ST1) 10, a second storage system (ST2) 20, a third storage system (ST3) 30, and a management server 60 for these storage systems.

When performing volume migration, the first storage system 10 includes an original volume (Origin VOL) 100, which is a data migration source, and a first target volume (Target VOL) 100A as a data migration destination volume which is an execution target of data migration or data replication from the original volume 100. The second storage system 20 includes a second target volume 100B and the third storage system 30 includes a third target volume 100C.

The host computer 70 is connected to the first storage system 10 via a communication network 80 such as a front-end SAN. The second storage system 20 and the third storage system 30 are connected to external connection ports of the first storage system, respectively. The management server 60 is connected via a communication network 90, such as a LAN, to the first storage system 10, the second storage system 20, and the third storage system 30, respectively.

Intra-chassis data copying is performed between the original volume 100 and the first target volume 100A and inter-chassis data copying performed between the original volume 100, the second target volume 100B, and the third target volume 100C.

The original volume 100 is set to a parity group (ENCRYPTED PG) 200 to which an encryption function is set; and the first target volume 100A is set to a parity group (NORMAL PG) 200A to which the encryption function is not set. The second target volume 100B is set to a parity group 200B to which the encryption function is set. The third target volume 100C is set to a parity group 200C to which the encryption function is not set.

The data encryption function in the storage system is applied to each parity group. If the encryption function is set to a parity group and when data is written to a volume which is set to the parity group, the data written to the storage drive is encrypted. The encryption setting is executed by a controller for the storage system. As other forms of the encryption setting, there are storage-drive-based encryption and host-computer-based encryption.

A "parity group to which the encryption function is not set" means a state where the encryption function is mounted in the storage system, but that function is turned off by the controller according to the operation based on an authority of a security administrator 40; or the relevant function is not originally mounted in the storage system. A parity group is a combination of a plurality of hard disk drives according to a RAID level. Drives equipped with the encryption function are used for encryption of parity groups.

Figure 2:
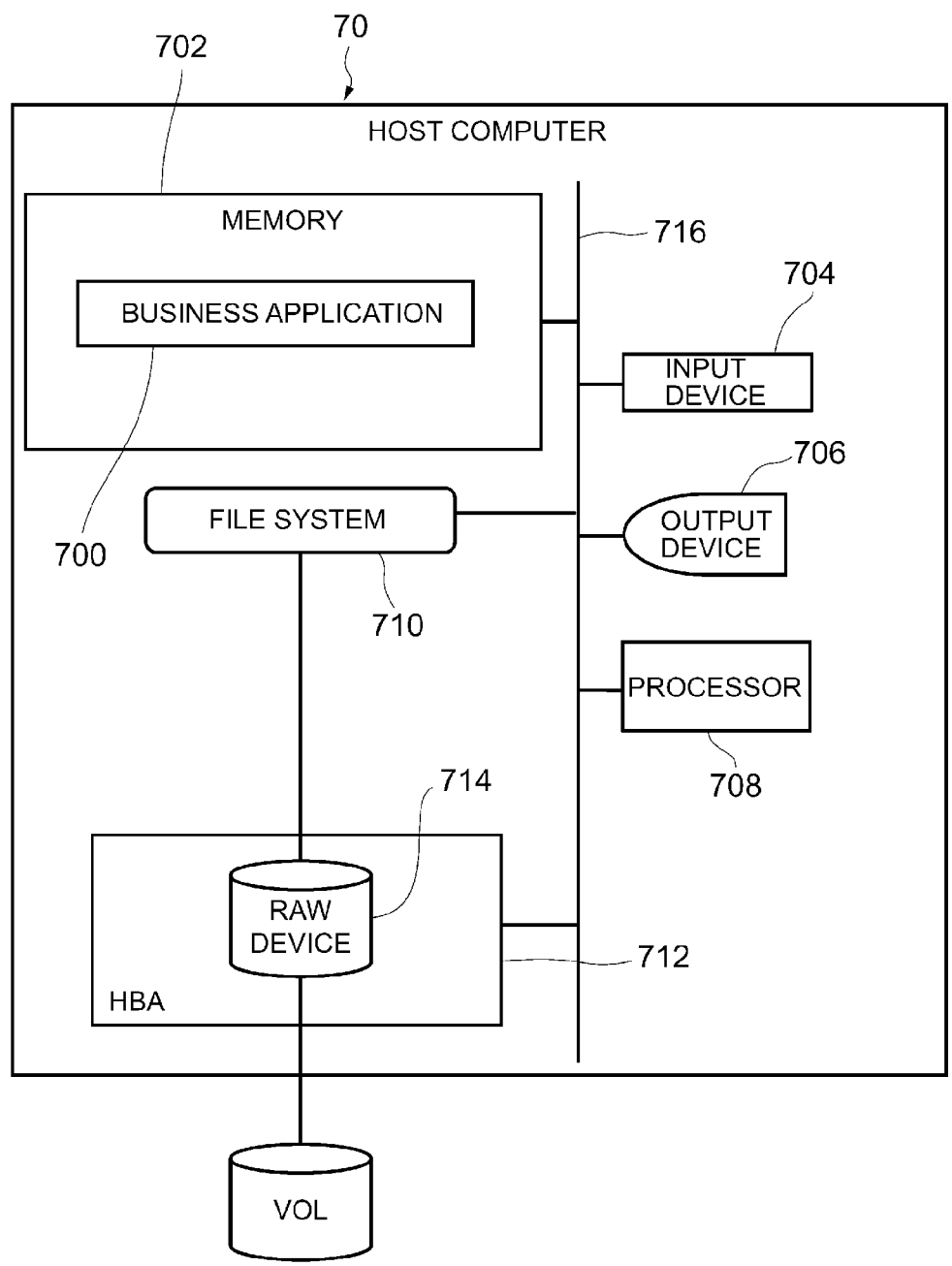
FIG. 2 is a block configuration diagram of a host computer.

FIG. 2 is a block configuration diagram of the host computer 70. The host computer includes: a memory 702 storing, for example, business application software 700; an input device 704; an output device 706; a processor 708; a file system 710 that enables file access to the storage system; a hot bus adapter (HBA) 712 for connection to the storage system; and an internal bus 716 connecting these elements. If a raw device 714 is set to the HBA 712, the host computer can access the storage system 10 without the intermediary of the file system.

Figure 3:
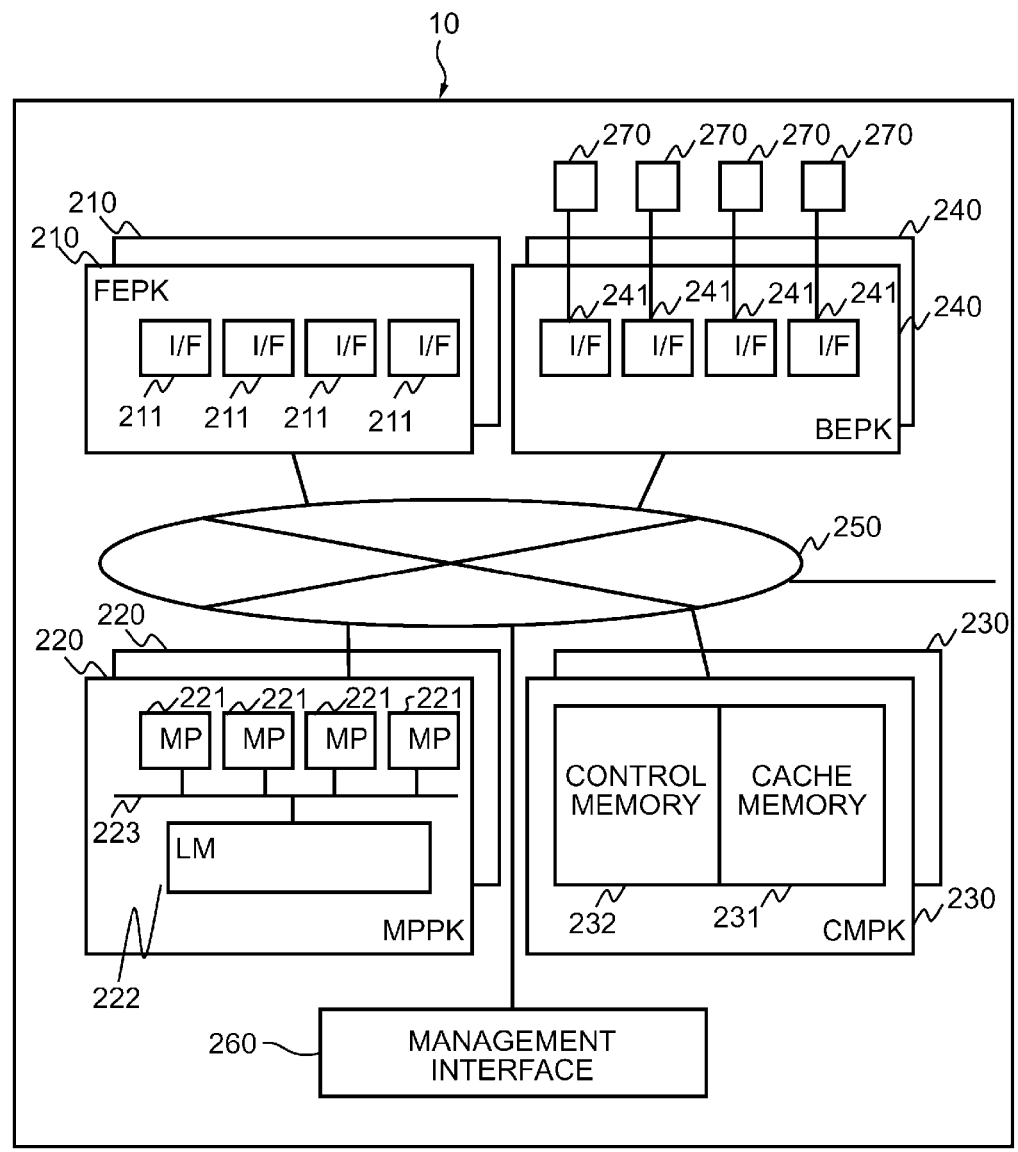
FIG. 3 is a block configuration diagram of a storage system.

FIG. 3 is a hardware block diagram of the first storage system 10. Since the second storage system 20 and the third storage system 30 have the same configuration as that of the first storage system, its explanation has been omitted. The host computer 70 serving as the upper computer is connected to an interface (I/F) 211 of each front-end package (FEPK) 210. A storage drive such as a hard disk drive is connected to each interface (I/F) 241 of each back-end package (BEPK) 240. The front-end package 210 receives a read/write request from the host computer 70 and transfers the read/write request to a microprocessor package (MPPK) 220.

Each microprocessor package 220 processes the read/write request and the back-end package 240 writes write data to the storage drive 270 or reads data from the storage device 270. Each microprocessor package 220 has a plurality of microprocessors 221, a local memory 222, and an internal bus 223.

Each memory package 230 has: a cache memory 231 for temporarily storing write/read data; and a control memory 232 for recording control information. The reference numeral 260 represents a management interface to which the management server 60 is connected. The reference numeral 250 represents a switch for mutually connecting the respective elements such as the memory packages 220.

Data encryption is realized by the controller (back-end package 240). Encryption executed when data is written to a volume is performed by a combination of a public key and a secret key. The same encryption key (secret key) may be set to all the drives constituting a parity group or a different encryption key (secret key) may be set to each drive.

The management server 60 includes a storage management program 600 and a data encryption program 602 as shown in FIG. 1. A client as a security administrator 40 and a client as a storage administrator 50 are connected to the management server 60.

Figure 4:
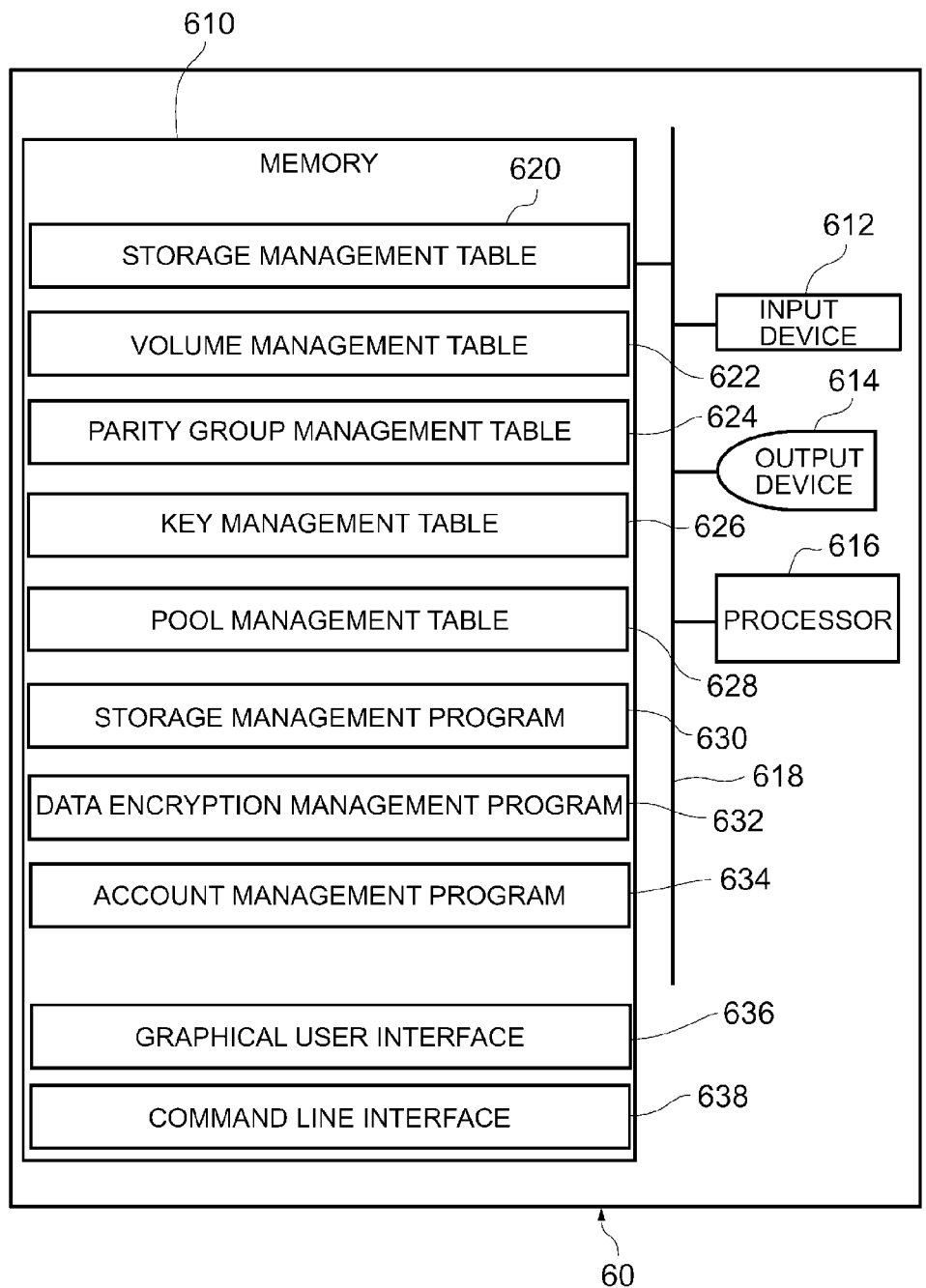
FIG. 4 is a block diagram of a management server.

FIG. 4 is a block diagram of the management server 60. The management server includes: a memory 610 storing management tables or management programs for realizing management functions of the storage system; an input device 612; an output device 614; a processor 616; and an internal bus 618 for connecting these elements.

The memory 610 stores a storage management table 620, a volume management table 622, a parity group management table 624, an encryption key (secret key) management table (key management table) 626, a pool management table 628, a storage management program 630, a data encryption management program 632, an account control program 634, a graphical user interface 636, and a command line interface 638.

FIG. 5 is an example of the storage management table 620 for managing the storage system. The storage management table 620 has a data structure in which a storage system ID 620A, a serial number 620B of the relevant storage system, and an IP address 620C of a management port 260 are associated with each other.

FIG. 6 is an example of the management table 622 for managing volumes. The volume management table 622 has a data structure in which a volume ID 622A of each storage system and an ID 622B of a parity group (PG) of each storage system corresponding to the relevant volume are associated with each other.

FIG. 7 is an example of the parity group management table 624 for managing parity groups (PG). The parity group management table 624 has a data structure in which a parity group ID 624A of each storage system, an encryption status 624B of the relevant parity group, and an encryption key ID 624C are associated with each other. The encryption status 624B [ON] indicates that the data encryption function is set to the relevant parity group and data written to a logical volume of the parity group is encrypted; the encryption status 624B [OFF] indicates that the encryption function is set to the relevant parity group, but data is not encrypted; and the encryption status 624B [N/A] indicates that the encryption function for the parity group is not originally assigned to the controller (the microprocessor package 220) for the storage system.

FIG. 8 is an example of the encryption key management table 626. The key management table 626 has a data structure in which an encryption key ID (626A), creation date and time (626B) of the relevant encryption key, an encryption key backup type (626C), and a KMS IP address 626D are associated with each other. The encryption key backup type includes the management system by KMS as described earlier and a management system by file storage. The file management system is to have the security administrator 40 store the encryption key. The encryption key management system by the KMS is to register the KMP IP address in the key management table 626.

Figure 9:
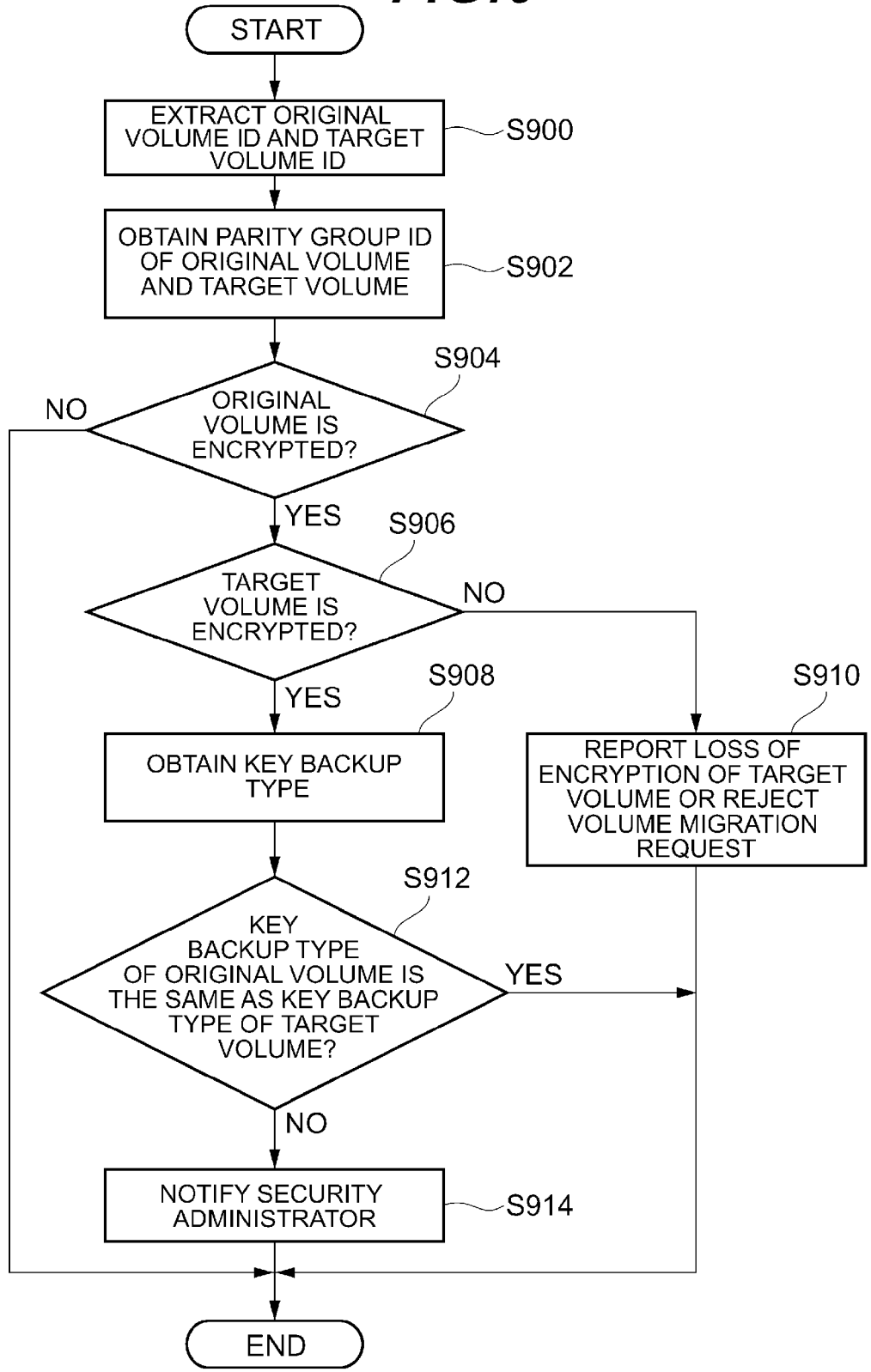
FIG. 9 is a flowchart illustrating encryption key management processing executed by a management server.

Next, encryption key management processing for volume migration between a plurality of volumes will be explained with reference to a flowchart. FIG. 9 shows the operation of the management server 60. When the storage administrator 50 sends a data migration request to the storage management program (volume migration management program) 630 of the management server 60, the storage management program 630 outputs an encryption setting check request to the data encryption management program 632 and starts processing of the flowchart in FIG. 9.

Next, the data encryption management program 632 executes the processing of the flowchart in FIG. 9 and executes processing for checking the encryption setting status of each of the original volume 100 and the target volume 100A (100B, 100C). Firstly, the data encryption management program 632 extracts the ID of the original volume 100 and the ID of the target volume 100A (100B, 100C) from the volume migration request from the storage administrator 50 (S900).

Next, the data encryption management program 632 refers to the volume management table 622 and checks the ID of a parity group 200 (200A, 200B, 200C) to which each of the original volume 100 and the target volume 100A (100B, 100C) belongs (S902).

Then, the data encryption management program 632 refers to the parity group management table 624 and judges whether or not the encryption function is set to the parity group 200 of the original volume 100 and the original volume 100 is encrypted (S904). If the original volume 100 is not encrypted, the management processing on the encryption key is not necessary and, therefore, the data encryption management program 632 terminates the processing of the flowchart. Then, the computer system 10 continues to execute data copying required for the volume migration between the original volume the target volume.

If the original volume 100 is encrypted, the data encryption management program 632 refers to the parity group management table 624 and judges whether or not the encryption function is set to the parity groups PG2 to PG4, to which the target volume 100A (100B, 100C) belongs, and the target volume is encrypted (S906).

If the encryption function setting status of the parity group of the target volume is [OFF] or [N/A], the data encryption management program 630 notifies the security administrator 40 that the encryption of data will be lost as a result of volume migration between the original volume and the target volume, and then rejects the data migration request from the storage administrator; or rejects the data migration request from the user without notice (S910). Either of the above-described means would be selected depends on the advance setting of the management server 60 by the storage management user 50. If the encryption function of the parity group of the target volume is [OFF], the security administrator who has received the above notice can demand that the data encryption management program should set the encryption function to [ON]. Having received this request, the data encryption management program can demand a change of the encryption function setting by the controller for the migration destination storage system.

If the encryption setting status of the parity group of the target volume is [ON] and the target volume is encrypted, the data encryption management program 632 obtains the encryption key backup type(626C) of each of the original volume and the target volume from the encryption key management table 626 (FIG. 8) (S908).

Next, the data encryption management program 632 judges whether or not the encryption key backup type of the original volume is the same as the encryption key backup type of the target volume (S912). If they are the same, the data encryption management program 632 terminates the processing of the flowchart. Subsequently, the data encryption management program 632 notifies the storage management program 630 of the termination of the processing of the flowchart; and the storage management program 630 issues an instruction to the migration source storage system and the migration destination storage system to execute data copying between the original volume and the target volume and these storage systems executes data copying between the original volume and the target volume.

If the encryption key backup type of the original volume 100 is different from the encryption key backup type of the target volume 100A (100B, 100C), the data encryption management program 632 notifies the security administrator 40, via the GUI 636, that the encryption key backup type of the original volume is different from the encryption key backup type of the target volume; and then terminates the processing of the flowchart.

After the data encryption management program 632 terminates the processing of the flowchart, the storage management program 630 waits for confirmation by the security administrator 40 and then executes volume migration between the original volume and the target volume.

On the other hand, if a backup type level of the parity group of the target volume is lower than that of the original volume, the data encryption management program 632 may not only send the notice, but also output a request to prompt the security administrator 40 to adjust the former type to the latter type, via the GUI to the security administrator 40. Specifically speaking, it is a case where the latter backup type is the file management system and the former backup type is the KMS system and the latter management system is to be changed to the KMS system. This change is executed by the security administrator 40. Unless these encryption key backup systems are adjusted to be the same backup system, the data encryption management program may reject the volume migration request from the storage administrator.

On the other hand, if the former backup level is higher than the latter backup level, the security administrator may only receive the notice and the storage management program may execute the volume migration request. Alternatively, in this case, the notice in S914 may not be issued.

Incidentally, if the storage administrator attempts to cancel the encryption function in the volume migration destination storage system by, for example, changing the encryption to the host-computer-based encryption, the encryption management program returns a negative judgment in S906. As the security management program sends the notice in S910 and then obtains an approval from the security administrator, the storage management program can continue the volume migration processing without having the security management program change the encryption setting status of the target volume.

Furthermore, the judgment in S904 and S906 is based on whether the encryption is performed or not, but the judgment may be based on superiority of the encryption level, instead. If the encryption level of the volume migration destination storage system is lower than the encryption level of the volume migration source storage system, the data encryption management program may execute the same processing as in S910.

According to the flowchart shown in FIG. 9, security of the volume mobility system can be maintained and enhanced while maintaining the flexibility of the volume mobility function by synchronizing the volume migration processing, the volume migration destination environment, and the processing for controlling the encryption setting status with respect to the volume migration destination environment.

Figure 10:
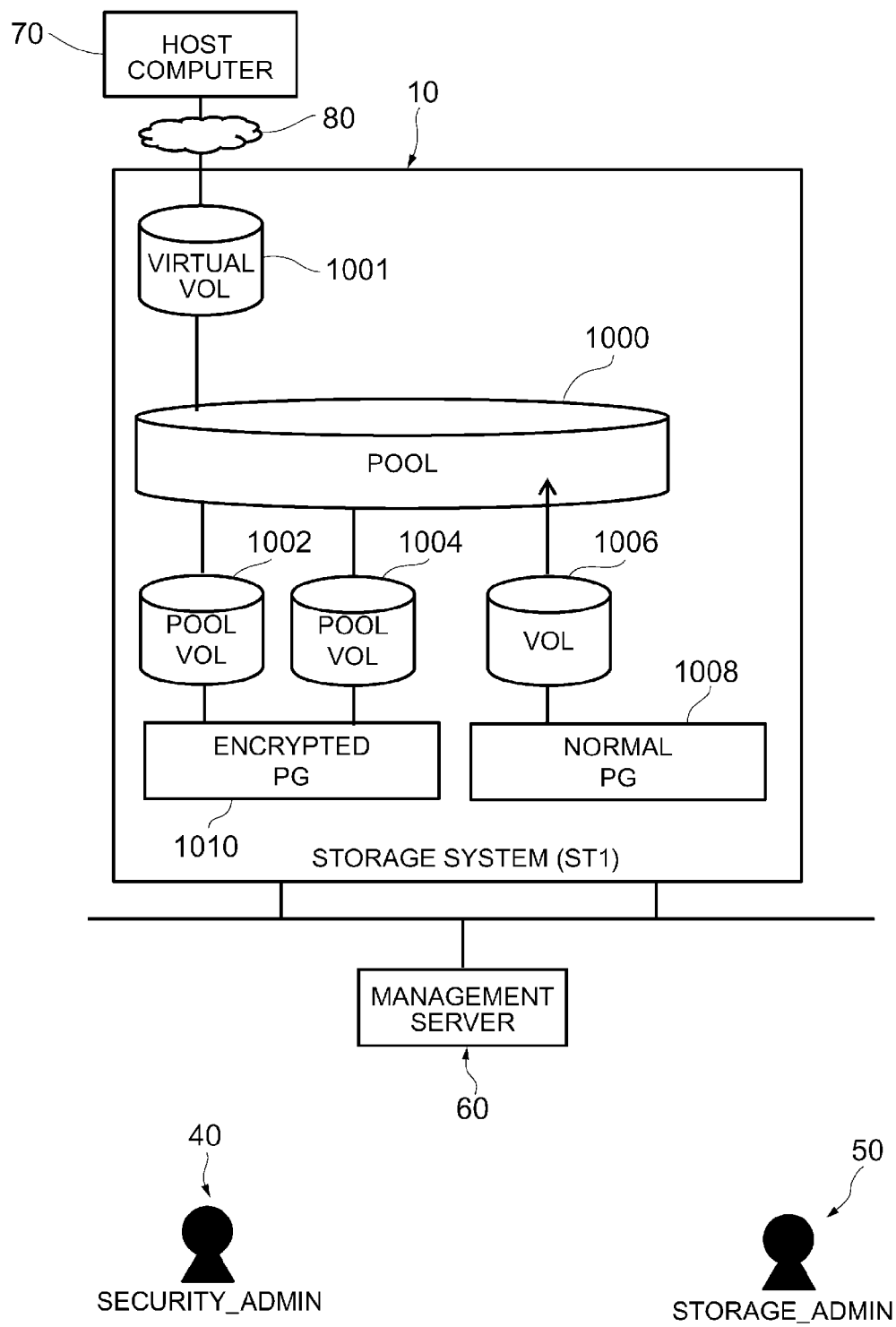
FIG. 10 is a block diagram of a computer system (second embodiment) including a storage system operated according to a thin provisioning system.

Next, a computer system according to a second embodiment will be explained. FIG. 10 is a block diagram of a computer system including a storage system 10 operated according to the thin provisioning. The difference between the system in FIG. 1 and the system according to the second embodiment will be mainly explained. The host computer 70 accesses a virtual volume 1001 that does not have an actual capacity. When the virtual volume 1001 is accessed by the host computer 70, the storage system 10 allocates a storage area having an actual capacity from a pool 1000 to the virtual volume 1001.

A volume(s) is allocated from a parity group 1010 to the pool 1000. Volumes allocated to the pool are pool volumes 1002, 1004. A pool volume is composed of a storage area with an actual capacity. The reference numeral 1006 represents a volume 1006 to be allocated from a parity group 1008 to the pool 1000.

The encryption key management method becomes a problem in this embodiment when the encryption setting status and the encryption key backup type of a parity group, which is the basis of a pool volume, are different from those of the pool. Referring to FIG. 10, the encryption function is set to the parity group 1010. The storage system 10 manages the pool 1000 so that the pool 1000 is encrypted in accordance with the pool volumes 1002, 1004 whose data can be encrypted.

On the other hand, data cannot be encrypted with respect to the volume 1006 from the parity group 1008 to which the encryption function is not set. So, if an attempt is made to allocate this volume 1006 as a pool volume to the pool 1000, the volume 1006 will not match the encryption status of the pool 1000. Therefore, processing for dealing with volume allocation to the pool is required.

FIG. 11 shows an example of a specific pool management table that is required for encryption setting processing of the computer system according to the second embodiment. The pool management table has a data structure in which a pool ID 1100, an encryption setting status 1102 of the relevant pool, a pool volume ID 1104, and a parity group ID 1106 are associated with each other.

Figure 12:
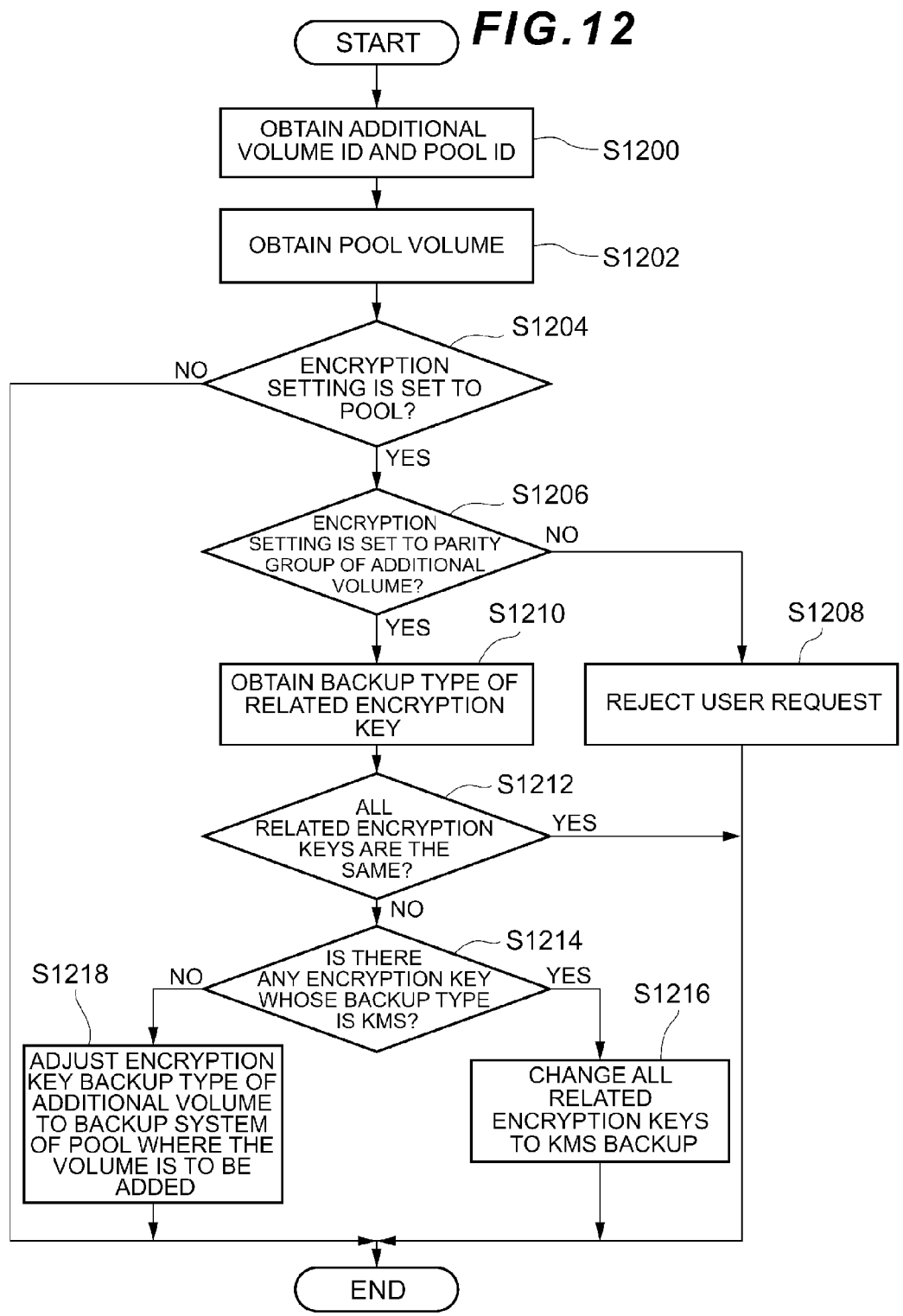
FIG. 12 is a flowchart illustrating encryption function setting processing according to thin provisioning.

Next, the encryption function setting processing according to thin provisioning will be explained with reference to a flowchart in FIG. 12. When the storage management program 630 receives a request for allocation of the volume 1006 to the pool 1000 from the storage administrator 50, the data encryption management program 632 receives an encryption setting check request from the storage management program 630 and then obtains the ID of the additional volume 1006 to be added to the pool 1000 and the ID of the pool 1000 from the request from the storage administrator 50 (S1200). Then, the data encryption management program 632 refers to the pool management table 1100 and obtains the IDs of the pool volumes 1002, 1006 already existing in the pool 1000 (S1202).

Subsequently, the data encryption management program 632 judges whether the encryption setting is set to the pool or not, by referring to the pool management table 1100 (S1204). If a negative judgment is returned in this step, the data encryption management program 632 terminates the processing of the flowchart and the storage management program 630 receives notice of termination of the flowchart processing from the encryption setting program 632 and allocates a new volume 1006 to the pool 1000.

Next, if an affirmative judgment is returned in S1204, the data encryption program 632 judges whether or not the encryption setting is set to the parity group 1008 to which the volume 1006 to be added to the pool 1000 belongs (S1206).

If a negative judgment is returned in this step, the data encryption management program 632 rejects the request from the storage administrator via the GUI 636 in order to prevent the volume 1006, which is not encrypted, from being allocated to the pool 1000 defined as an encryption target (S1208).

On the other hand, if an affirmative judgment is returned, the data encryption management program 632 obtains the encryption key backup type of the parity group 1010 related to the pool from the encryption key management table 626 based on the related parity group, that is, the parity group 1008 of the additional volume 1006 and the IDs of the pool volumes 1002, 1004 existing in the pool (S1202) (S1210).

Next, the data encryption management program 632 checks whether the backup types of all these related encryption keys are the same or not (S1212). If an affirmative judgment is returned, the data encryption management program terminates the processing of the flowchart. When this happens, the storage management program 630 issues an instruction to the controller for the storage system 10 to allocate the additional volume 1008 to the pool 1000.

On the other hand, if a negative judgment is returned in S1212, the data encryption management program 632 checks whether or not the key backup type of at least one of all the related encryption keys is the KMS management system (S1214). If an affirmative judgment is returned, the data encryption management program 632 notifies the security administrator 40 via the GUI 636 that the encryption key which has been backed up by an encryption key backup type other than the KMS system should be changed to the KMS system backup type (S1216).

On the other hand, if a negative judgment is returned in this step, the data encryption management program 632 applies a unified encryption key backup system other than KMS by, for example, prompting the security administrator to change the encryption key backup system of the additional volume 1006 to make it match the encryption key backup type of the pool to which the volume is to be added (S1218).

A unified encryption key backup type, such as the KMS system or the file management system, can be applied to the pool volumes belonging to the pool 1000 as a result of the processing in S1214. If there are a plurality of backup systems other than the KMS system, it is better to use the safest backup system as the unified backup system.

As a result of the above-described processing, the encryption key backup systems of the pool volumes can be adjusted to the same encryption key backup system as triggered by the addition of a new volume to the pool. Incidentally, the embodiment shown in FIG. 10 has described a case where the encryption function is not set to the parity group 1008; however, the encryption function can be set to the parity group 1008 as a premise of S1218.

Next, a third embodiment will be explained. The aforementioned embodiments adopt the configuration in which the data encryption management program 632 of the management server 60 executes the processing of the aforementioned flowcharts to determine an optimum backup form of the encryption key. On the other hand, the third embodiment provides a system by which the data encryption management program asks for an approval of the security administrator 40 when attempting to change the encryption key backup type. For this purpose, a control function managing authorities and roles of the security administrator 40 and the storage administrator in an integrated manner is required. The management server 60 includes management tables and control programs in order to realize the above-described function.

FIG. 13 is an example of an authority management table to which the correspondence relationship between each authority 1300B granted to a user and bit addresses 1300A is set. Each authority 1300B corresponds to each bit address 1300A. For example, [Key Management] corresponds to a bit address [4] and [Data Encryption Management] corresponds to a bit address [5]. The former authority includes the authority to approve, for example, the determination and change of a key pair (a public key and a secret key), backup of the secret key, and determination and change of the secret key backup type. The latter authority includes an authority to, for example, encrypt data and cancel the encryption of the data.

FIG. 14 is an example of a table for managing the correspondence relationship between roles of the user and (shown as Role name 1400B) authority bitmaps (shown as Authority Bitmap 1400C). An authority bitmap 1400C is a set of all authority addresses and a role (shown as Role ID 1400A) is a management unit of one or more authorities. For example, Role 2 is a role relating to security management and the authorities corresponding to the first bit and fourth to sixth bits of the authority address respectively are assigned to Role 2. Therefore, Role 2 has a wider function in terms of security than Role 1 to which only Role 1 (View Security Information) is assigned. Role 2 is set to the security administrator 40. Roles relating to other than security, such as Roles 6 to 13, are set to the storage administrator 50. All the authorities are granted by Role 14 to a maintenance administrator.

FIG. 15 is a management table for managing the correspondence relationship between user group (UG) IDs 1500A and roles 1500B and FIG. 16 is a management table for managing the correspondence relationship between user IDs 1600A and user group IDs 1600B. A user ID 1600A is set to a user (administrator). The user ID 1600A is set to indicate user classification information. For example, [ST_ADMIN1] indicates the storage administrator 50 and [SECURITY_AD- MIN] indicates the security administrator 40. Each user ID belongs to a user group. One or more roles are set to each user group. Therefore, each user ID is associated with one or more authorities via the user group ID, the role ID, and the authority bitmap. A user group is an index for grouping users.

Figure 17A:
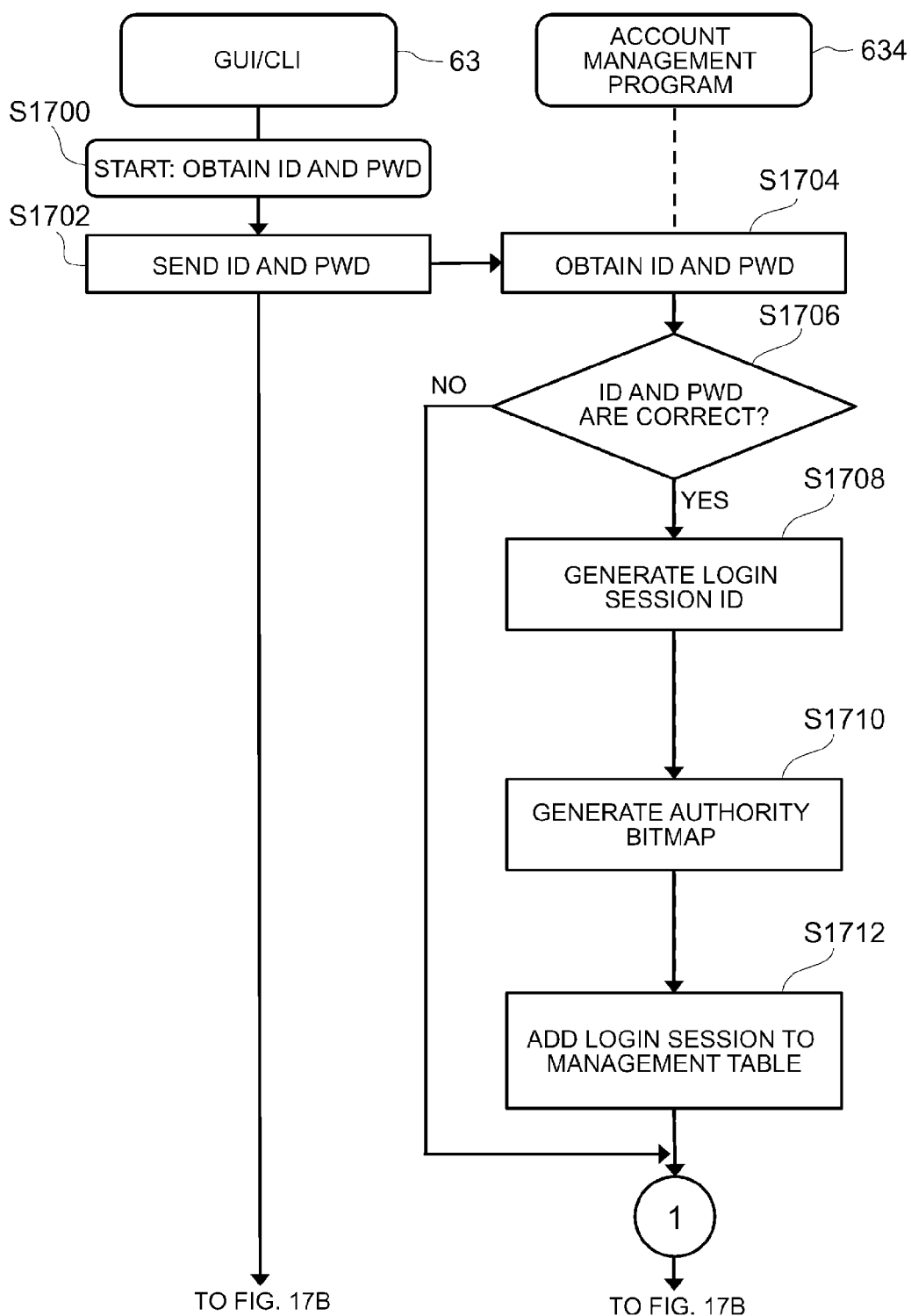
FIG. 17A is a flowchart (first half) illustrating processing executed by the management server on login from a user.

FIGS. 17A, 17B are flowcharts illustrating processing executed by the management server 60 on login from the user. When the GUI 636 or the command line interface (CLI) 638 of the management server 60 accepts login from the user, it obtains a user ID and a password from the login (S1700) and sends them to the account management program 634 (S1702).

When the account management program 634 obtains various IDs and password (S1704), it judges whether they are correct or not (S1706). If a negative judgment is returned in this step, the account management program 634 jumps to login result message creation processing without executing login session creation processing (S1708 to S1712). On the other hand, if an affirmative judgment is returned, the account management program 634 executes the login session creation processing.

Firstly, the account management program 634 generates a login session ID (S1708). Then, the account management program 634 generates an authority bitmap to be allocated to the session ID from the user ID, the user group ID, and the role ID by referring to the authority bitmap the management table (FIG. 13) (S1710). Subsequently, the account management program 634 adds the generated login session to the session management table (S1712).

Next, as shown in FIG. 17B, the account control program 636 creates a login result message (S1714) and then sends the login message to the GUI (CLI) (S1716). After the GUI or similar obtains this (S1718), it judges whether the login session ID is [NULL] or not (S1720). If the user ID and the password are not correct, an affirmative judgment is returned in the above step and the account management program 636 creates a message for rejecting the login and sends it to the GUI or similar (S1726); and the GUI displays this message (S1728).

On the other hand, if the GUI confirms the session ID, it keeps the login session ID (S1722) and creates a message to permit the user login (S1724).

Figure 18:
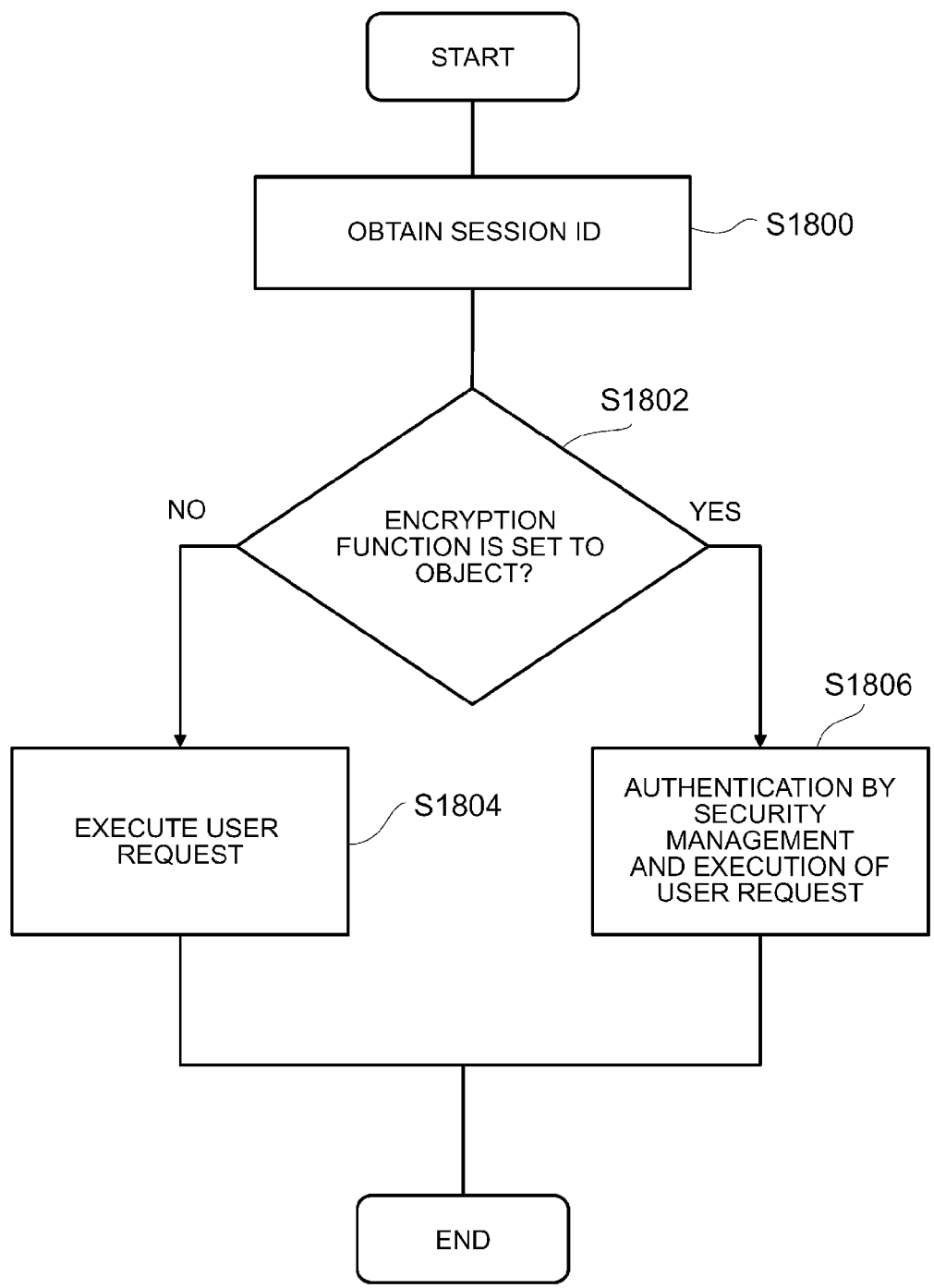
FIG. 18 is a flowchart illustrating processing executed by the management server on login from a storage administrator.

If the management server 60 permits the user login, the storage management program 630 obtains the session ID from the session management table as shown in FIG. 18 (S1800) and obtains user request information and the authority bitmap that are attached to the session ID. The storage management program 630 judges, based on the user request information, whether or not the encryption function is set to at least one object which is a target of processing requested by the user (S1802). If the storage management program returns a negative judgment in this step, there is nothing to pay attention to with respect to encryption of the object. So, the storage management program 630 executes the user request, for example, data migration or data replication between a plurality of volumes or addition of a new volume to the pool (S1804). Incidentally, the [Object] means, for example, an original volume, a target volume, a parity group, a pool, a pool volume, or a new volume to be added to the pool with respect to data migration, data replication, or allocation of the new volume to the pool.

Figure 19:
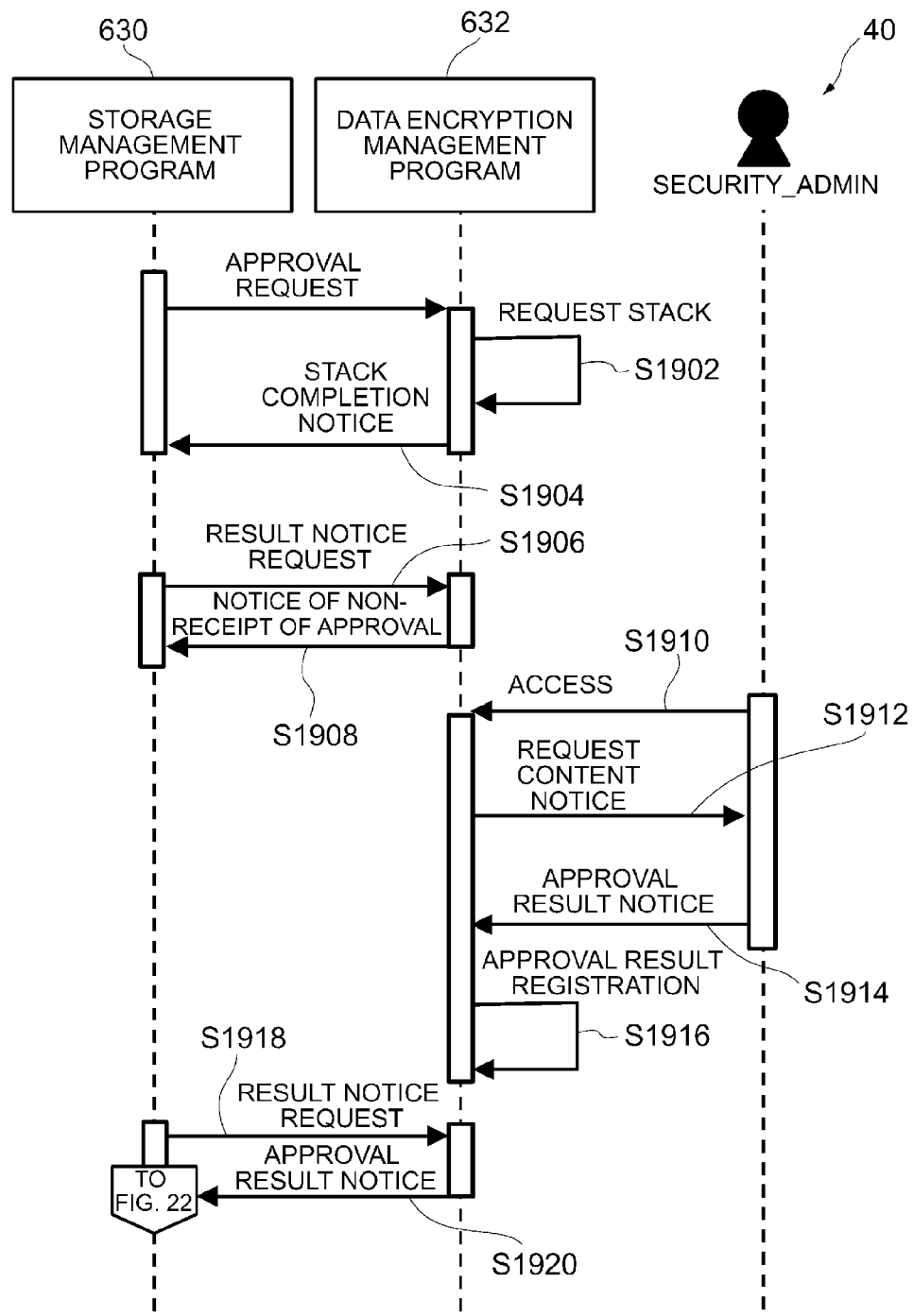
FIG. 19 is a flowchart for explaining security administrator authentication processing on login from the storage administrator to the management server.

If an affirmative judgment is returned in S1802, the storage management program 630 executes authentication processing on the security administrator before the user request processing. This authentication processing will be explained with reference to a flowchart in FIG. 19. The storage management program 630 requests for approval from the data encryption management program with respect to the user request processing (S1900). The data encryption management program 630 stacks this request (S1902) and issues a stack completion notice to the storage management program (S1904).

Next, the storage management program 630 repeatedly requests an approval result from the security administrator (SECURITY_ADMIN) 40 from the data encryption management program 632 (S1906). Since the data encryption management program 632 has not received the approval result yet, it issues a notice of non-receipt of approval to the storage management program (S1908).

When the security administrator 40 founds by, for example, email that the approval request has arrived from the storage management program 630, the security administrator 40 accesses (logs into) the data encryption management program (S1910). In response to this access, the data encryption management program 632 issues the approval request, which has been stacked, to the security administrator (S1912). The security administrator 40 notifies the data encryption management program 632 of the approval result (S1914). The data encryption management program 632 registers the approval result (S1916). Then, after receiving an approval result notice request from the storage management program 630 (S1918), the data encryption management program 632 sends the approval result notice (S1920).

Figure 20:
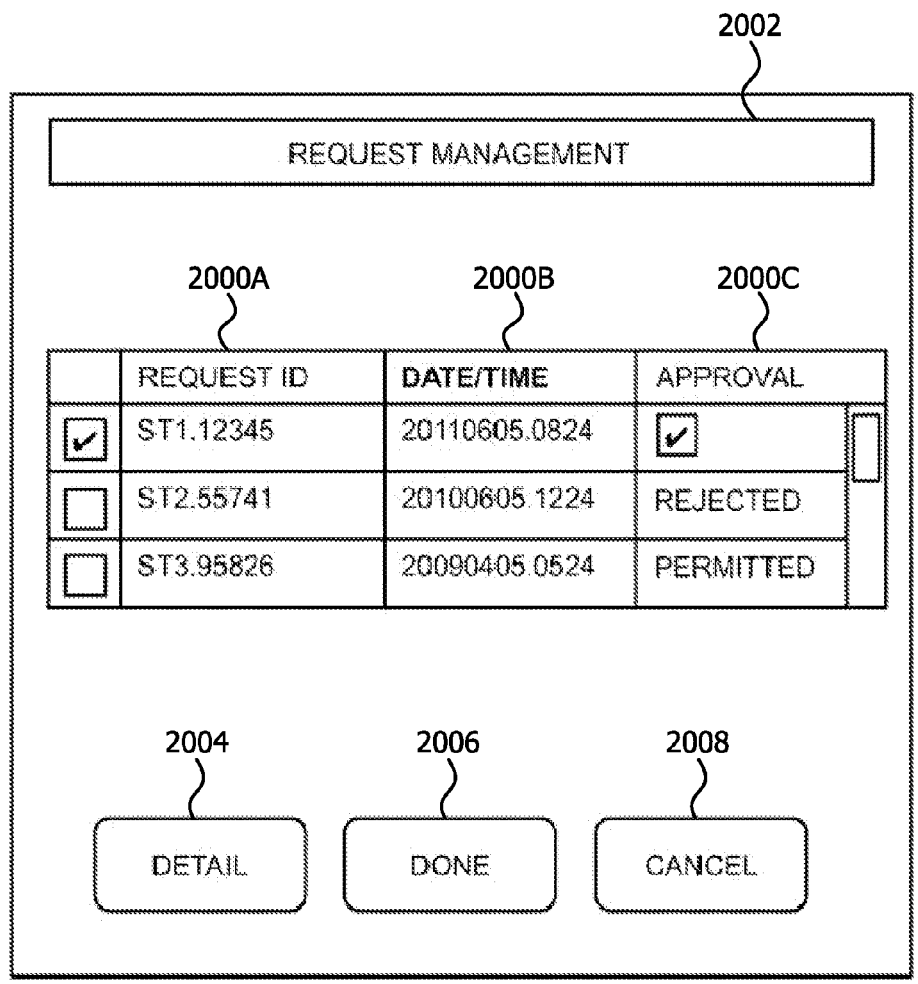
FIG. 20 is an example of an approval request screen provided by the management server to the security administrator via a GUI.
Figure 21:
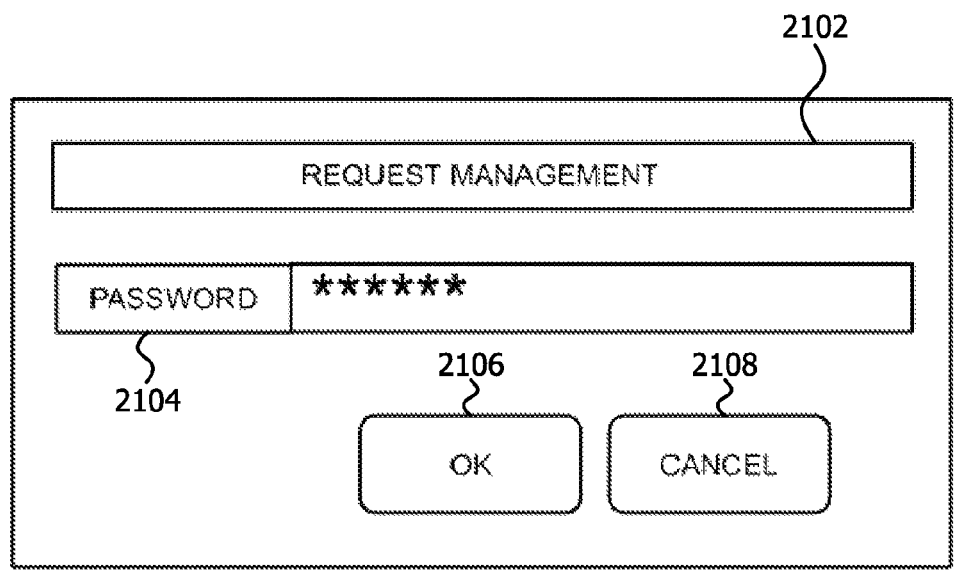
FIG. 21 is an example of a password input screen for an approval request.

FIG. 20 is an example of an approval request screen provided by the data encryption management program 632 via the GUI 636 to the security administrator 40. The request screen includes a request ID 2000A, request issue date and time 2000B, and an approval field 200C. If the security administrator inputs a check mark in the approval field and clicks [DONE], a password input screen in FIG. 21 is displayed at the security administrator 40. If the security administrator clicks [OK] (shown as 2106) and the password 2104 is thereby authenticated, [Permitted] is set to the approval field of the approval request screen. On the other hand, if [DONE] is clicked without inputting the check mark, [Rejected] is set. Incidentally, if the security administrator 40 inputs the check mark in a box on the left side of the request ID and clicks [DETAIL] and the password is thereby approved, the details of the user request such as the specific content of the user request which requires checking of the encryption setting for, for example, data migration, data replication, or addition of a volume to an HDP pool are displayed. [CANCEL] )shown as 2108) is clicked for reinput. An approval processing date and time field may be included in the approval screen in FIG. 20. The request ID is composed of an ID of a target storage system of the relevant request from the storage administrator and an ID assigned to the request.

Figure 22:
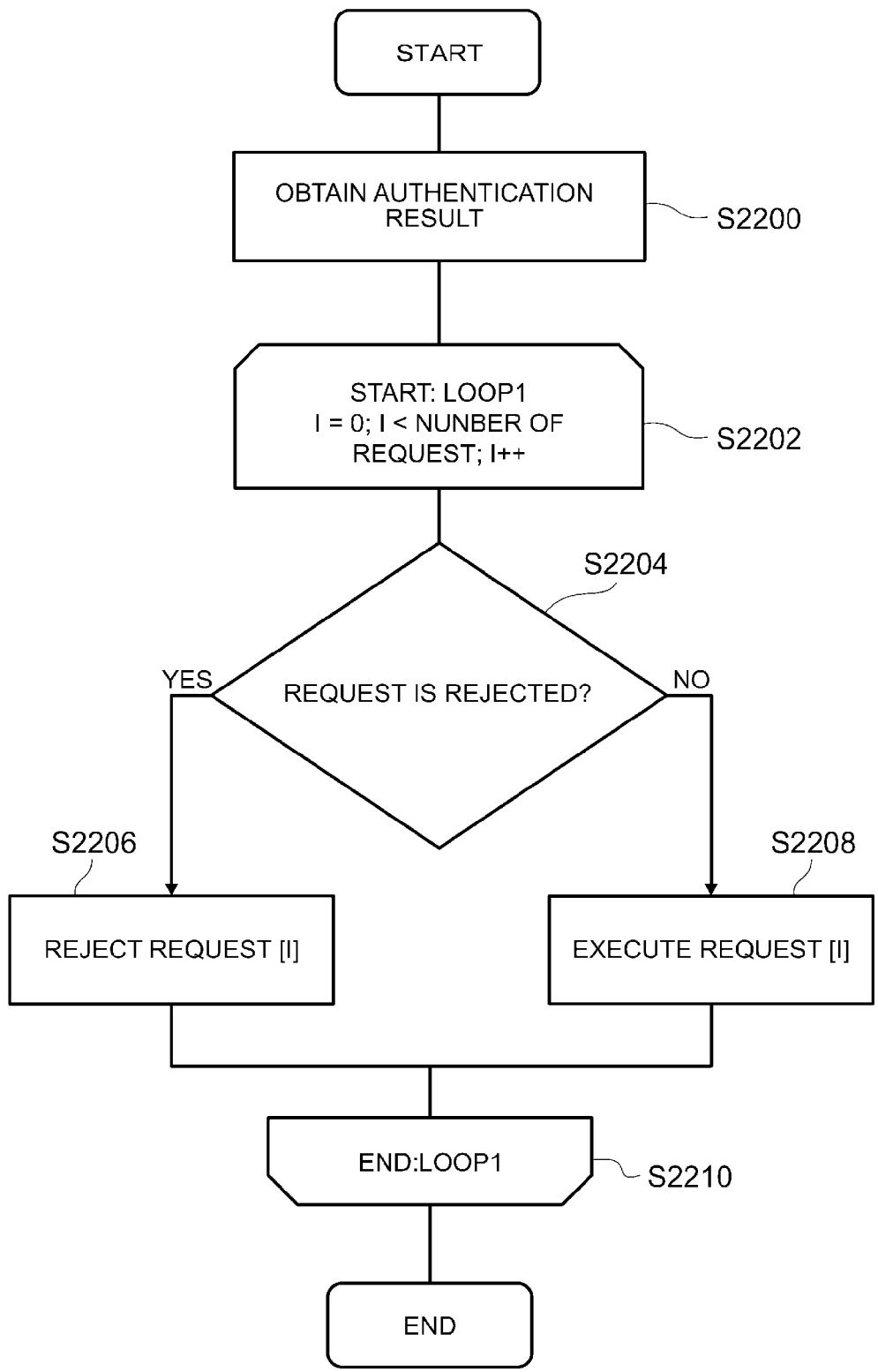
FIG. 22 is a flowchart illustrating processing for judging whether a request from the storage administrator can be executed or not.

When the storage management program 630 receives the approval result by the security administrator from the data encryption management program 632, it executes processing relating to the execution of the user request (S1806). FIG. 22 shows a flowchart illustrating user request execution possibility judgment processing as the details of the above-described processing.

Firstly, the storage management program 630 obtains one or more requests (all the requests) from the storage administrator 50 (S2200). The storage management program 630 obtains one request from among the plurality of user requests (S2202) and judges whether an encryption setting request relating to the above-mentioned request is approved or rejected by the security administrator 40 (S2204). If the request is approved, the storage management program 630 executes processing for executing the user request (S2208); and if the request is rejected, the storage management program 630 rejects the user request (S2206) and notifies a user-side computer to that effect. The storage management program 630 repeats the processing from S2204 to S2208 with respect to all the requests.

Figure 23:
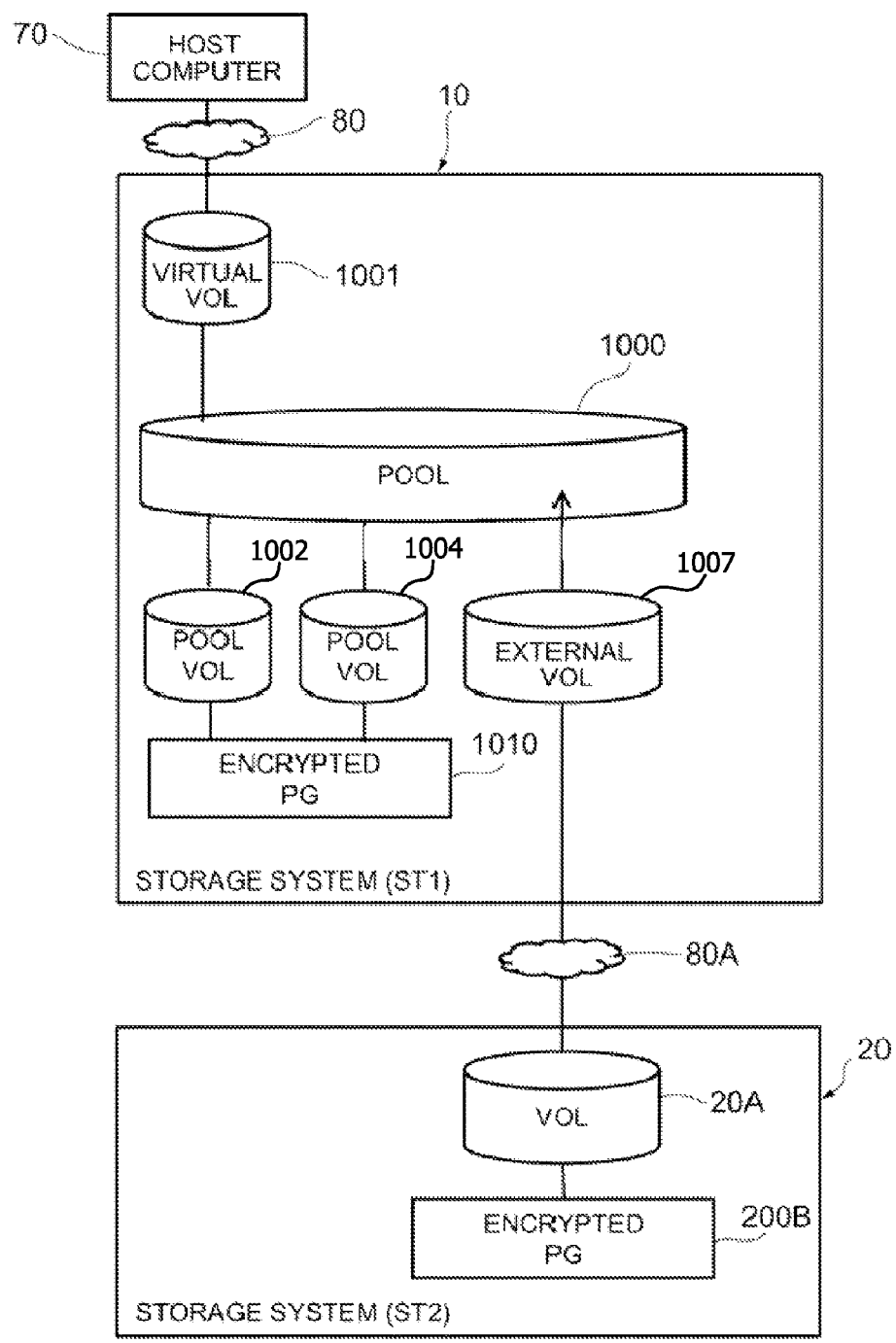
FIG. 23 is a block diagram of a variation of the computer system shown in FIG. 10.

FIG. 23 is a variation of the computer system in FIG. 10. With the computer system in FIG. 10, a volume to be added to the pool 1000 is provided from a parity group in the storage system 10; and with the computer system in FIG. 23, a volume 20A of a parity group of a second storage system 20B which is externally connected to the first storage system 10 is allocated to the pool 1000 of the first storage system. The first storage system 10 and the second storage system 20 are connected via a back-end SAN 80A. The external volume 1007 of the first storage system 10 is a virtual volume to allocate the volume 20A of the second storage system 20 to the pool 1000.

Figure 24:
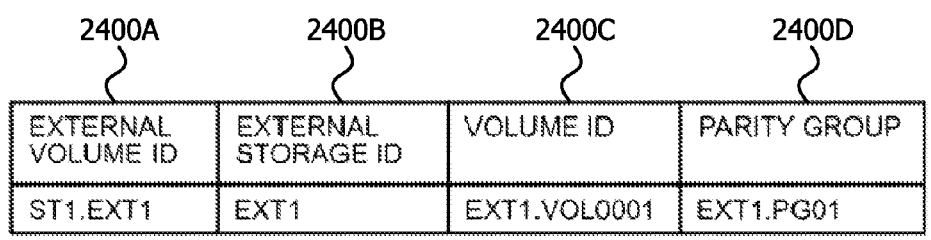
FIG. 24 is an example of a table for managing the correspondence relationship between the external volume in the first storage system, the external storage system, the volume to be added to the pool of the first storage system, and a parity group of that volume.

With the computer system in FIG. 23, for example, the aforementioned processing for adjusting the encryption key backup type is also applied to the encryption setting status of the parity group 200B and the encryption setting status of the pool. Incidentally, FIG. 24 is an example of a table for managing the correspondence relationship between the external volume 1007 in the first storage system 10, the external storage system 20, the volume 20A to be added to the pool 1000 of the first storage system 10, and a parity group 200B of that volume. The data encryption program 632 refers to this table as necessary when executing the aforementioned various processing relating to the encryption setting.

REFERENCE SIGNS LIST

10 First storage system
20 Second storage system
30 Third storage system
70 Host computer
100 Original volume
100A to 100C Target volumes
200, 200A to 200C Parity groups
60 Management server

The invention claimed is:

1. A computer system comprising:
a memory resource to be accessed by a host computer;
a storage system for providing a volume, whereby a logical memory resource is created, to the host computer, the storage system including: a first storage system that has a first parity group and sets a first volume to the first parity group; and a second storage system that has a second parity group and sets a second volume to the second parity group; and
a management device for managing migration of the volume;
wherein the second volume is the migration destination object;
wherein the management device controls the first storage system and the second storage system in order to execute the volume migration processing between the first and the second volume;
wherein, when detecting a task of migration of the volume based on a request from a first administrator, the management device compares an encryption function setting status of the volume with the encryption function setting status of a migration destination object of the volume; and sends notice of this comparison result to a second administrator, who is different from the first administrator, for security management of the storage system;
wherein, if the management device compares an encryption level of the second volume with the encryption level of the first volume and determines that the former encryption level is lower than the latter encryption level, the management device sends notice of this result as a first judgment result to the second administrator;
wherein, if the management device compares an encryption key backup type of the second volume with the encryption key backup type of the first volume and determines that the former encryption key backup type is inferior to the latter encryption key backup type, the management device sends notice of this result as a second judgment result to the second administrator; and determines whether or not it is necessary to continue the volume migration request from the first administrator, based on a request from the second administrator who has received the notice;
wherein, if it is determined that the first volume is encrypted and the second volume is not encrypted, the management device notifies the second administrator of the first judgment result; and
wherein, if both the first volume and the second volume are encrypted and the encryption key backup type of the first volume is the same as the encryption key backup type of the second volume, the management device has the first storage system and the second storage system execute processing for migrating the volume from the first volume as a migration source to the second volume as a migration destination without requiring the second judgment result; and if the encryption key backup type of the first volume is different from the encryption key backup type of the second volume, the management device notifies the second administrator of the second judgment result.

2. The computer system according to claim 1, wherein the encryption key backup type includes a first system for having an external server back up the encryption key and a second system for having the security administrator back up the encryption key; and if the encryption key of the first volume is backed up by the first system and the encryption key of the second volume is backed up by the second system, the management device notifies the second administrator of the second judgment result.

3. The computer system according to claim 1, wherein the storage system includes:
a virtual volume to be accessed by the host computer;
a pool for allocating the memory resource to the virtual volume; and
a parity group; and
wherein a volume is allocated from the parity group by recognizing the pool as the object.

4. The computer system according to claim 3, wherein if it is determined that an encryption function setting is set to the pool and the encryption function setting is not set to the parity group of the volume to be allocated to the pool, the management device rejects a request from the first administrator to migrate the volume to the pool.

5. The computer system according to claim 4, wherein if it is determined that the encryption function setting is set to the pool and the encryption function setting is also set to the parity group of the volume to be allocated to the pool, the management device compares the encryption key backup type of the pool with the encryption key backup type of the volume to be allocated from the parity group to the pool; and
if it is determined that these encryption key backup types are not the same, the management device sends notice to the second administrator to prompt them to make these encryption key backup types the same.

6. The computer system according to claim 5, wherein the encryption key backup type includes a first system for having an external server back up the encryption key and a second system for having the security administrator back up the encryption key; and if it is determined that either of the encryption key backup type of the pool or the encryption key backup type of the volume to be allocated from the parity group to the pool is the first system, the management devices sends notice to the second administrator to prompt them to change the encryption key backup type so that the encryption key managed by the second system will be backed up by the first system.

7. The computer system according to claim 1, wherein the management device:

sends a request of the first administrator for the volume migration; and determines whether the request for the volume migration can be continued or not, based on an approval result of the request from the second administrator.

8. The computer system according to claim 3, wherein the parity group exists in an external storage system that is connected externally to the storage system.

9. A method of controlling a volume migration control for a computer system comprising the steps of:

accessing a memory resource by a host computer;

providing to the host computer a volume of a storage system whereby a logical memory resource is created, the storage system including: a first storage system that has a first parity group and sets a first volume to the first parity group;

and a second storage system that has a second parity group and sets a second volume to the second parity group; and managing migration of the volume of a management device;

wherein the second volume is the migration destination object;

wherein the management device controls the first storage system and the second storage system in order to execute the volume migration processing between the first and the second volume;

the method including the steps of:

comparing by the management device, when detecting a task of migration of the volume based on a request from a first administrator, an encryption function setting status of the volume with the encryption function setting status of a migration destination object of the volume; and sending notice of this comparison result to a second administrator, who is different from the first administrator, for security management of the storage system;

sending by the management device, if the management device compares an encryption level of the second volume with the encryption level of the first volume and determines that the former encryption level is lower than the latter encryption level, notice of this result as a first judgment result to the second administrator;

sending by the management device, if the management device compares an encryption key backup type of the second volume with the encryption key backup type of the first volume and determines that the former encryption key backup type is inferior to the latter encryption key backup type, notice of this result as a second judgment result to the second administrator; and determines whether or not it is necessary to continue the volume migration request from the first administrator, based on a request from the second administrator who has received the notice;

notifying by the management device, if it is determined that the first volume is encrypted and the second volume is not encrypted, the second administrator of the first judgment result;

wherein, if both the first volume and the second volume are encrypted and the encryption key backup type of the first volume is the same as the encryption key backup type of the second volume, the management device has the first storage system and the second storage system execute processing for migrating the volume from the first volume as a migration source to the second volume as a migration destination without requiring the second judgment result; and if the encryption key backup type of the first volume is different from the encryption key backup type of the second volume, the management device notifies the second administrator of the second judgment result.

\* \* \* \* \*